US009802451B2

(12) United States Patent
Mida et al.

(10) Patent No.: US 9,802,451 B2
(45) Date of Patent: *Oct. 31, 2017

(54) GOOSENECK HITCH BALL

(71) Applicant: Cequent Performance Products, Inc., Plymouth, MI (US)

(72) Inventors: Lynn H. Mida, Chelsea, MI (US); Jacob S. Belinky, Carleton, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,682

(22) Filed: Jan. 26, 2016

(65) Prior Publication Data

US 2016/0236525 A1 Aug. 18, 2016

Related U.S. Application Data

(63) Continuation of application No. 13/833,789, filed on Mar. 15, 2013, now Pat. No. 9,242,520.

(51) Int. Cl.
| | |
|---|---|
| *B60D 1/06* | (2006.01) |
| *B60D 1/48* | (2006.01) |
| *B60D 1/52* | (2006.01) |
| *B60D 1/54* | (2006.01) |

(52) U.S. Cl.
CPC ............ *B60D 1/06* (2013.01); *B60D 1/488* (2013.01); *B60D 1/52* (2013.01); *B60D 1/54* (2013.01)

(58) Field of Classification Search
CPC . B60D 1/488; B60D 1/52; B60D 1/06; B60D 1/54
See application file for complete search history.

(56) References Cited

U.S. PATENT DOCUMENTS

| | | | |
|---|---|---|---|
| 5,016,898 A | 5/1991 | Works et al. | |
| 5,472,222 A * | 12/1995 | Marcy ...................... | B60D 1/52 280/433 |
| D397,657 S | 9/1998 | Lindenman et al. | |
| D399,804 S * | 10/1998 | Lindenman ................. | D12/162 |
| D401,542 S | 11/1998 | Lindenman et al. | |
| 5,860,671 A * | 1/1999 | Mackeown .............. | B60D 1/54 280/491.5 |
| D406,086 S | 2/1999 | Lindenman et al. | |
| 6,095,545 A * | 8/2000 | Bol, II ..................... | B60D 1/06 280/491.1 |
| 6,099,015 A * | 8/2000 | Marcy ...................... | B60D 1/52 280/433 |

(Continued)

*Primary Examiner* — Kevin Hurley
*Assistant Examiner* — Gabriela C Craciun
(74) *Attorney, Agent, or Firm* — McDonald Hopkins LLC

(57) ABSTRACT

A hitch ball is shown and described. The hitch ball may include a ball member, a body extending from the ball member, and a locking member in communication with the body. The hitch ball may also include a first release mechanism positioned in the ball member, the first release mechanism operatively coupled with the locking member, where positioning the first release mechanism in an first direction positions the locking member in a disengaged position, and a second release mechanism positioned in the body, the second release mechanism operatively coupled with the locking member, where positioning the second release mechanism in a second direction positions the locking member in the disengaged position.

27 Claims, 14 Drawing Sheets

(56) References Cited

U.S. PATENT DOCUMENTS

| | | | |
|---|---|---|---|
| 6,616,168 B2* | 9/2003 | Belinky | B60D 1/06 |
| | | | 280/491.5 |
| 6,695,338 B1 | 2/2004 | Roberts | |
| 6,783,144 B2 | 8/2004 | McCoy et al. | |
| 6,837,511 B1 | 1/2005 | Johnson | |
| 6,883,822 B1 | 4/2005 | Smith | |
| 6,969,090 B1 | 11/2005 | Works | |
| 6,983,950 B2 | 1/2006 | McCoy et al. | |
| 7,168,727 B2 | 1/2007 | Dick | |
| 7,918,476 B1 | 4/2011 | Linger | |
| 8,011,685 B2 | 9/2011 | Belinky et al. | |
| 8,272,661 B2 | 9/2012 | Erickson | |
| 8,286,986 B2 | 10/2012 | Drake et al. | |
| 8,414,009 B2 | 4/2013 | Stanifer et al. | |
| 2003/0034633 A1* | 2/2003 | Belinky | B60D 1/06 |
| | | | 280/507 |
| 2004/0256837 A1 | 12/2004 | McCoy | |
| 2005/0001408 A1* | 1/2005 | Irgens | B60D 1/52 |
| | | | 280/511 |
| 2005/0104326 A1 | 5/2005 | Hord et al. | |
| 2007/0108729 A1 | 5/2007 | Dick | |
| 2009/0079164 A1* | 3/2009 | Columbia | B60D 1/06 |
| | | | 280/511 |
| 2009/0102155 A1 | 4/2009 | Shockley et al. | |
| 2009/0224511 A1 | 9/2009 | Dick et al. | |
| 2013/0113180 A1 | 5/2013 | McCoy et al. | |
| 2013/0127137 A1 | 5/2013 | McCoy et al. | |
| 2014/0265252 A1* | 9/2014 | Mida | B60D 1/488 |
| | | | 280/512 |
| 2015/0306929 A1* | 10/2015 | McAllister | B60D 1/06 |
| | | | 177/136 |
| 2015/0360528 A1* | 12/2015 | McCall | B60D 1/06 |
| | | | 280/512 |
| 2016/0114639 A1* | 4/2016 | Okerlund | B60D 1/60 |
| | | | 280/507 |

* cited by examiner

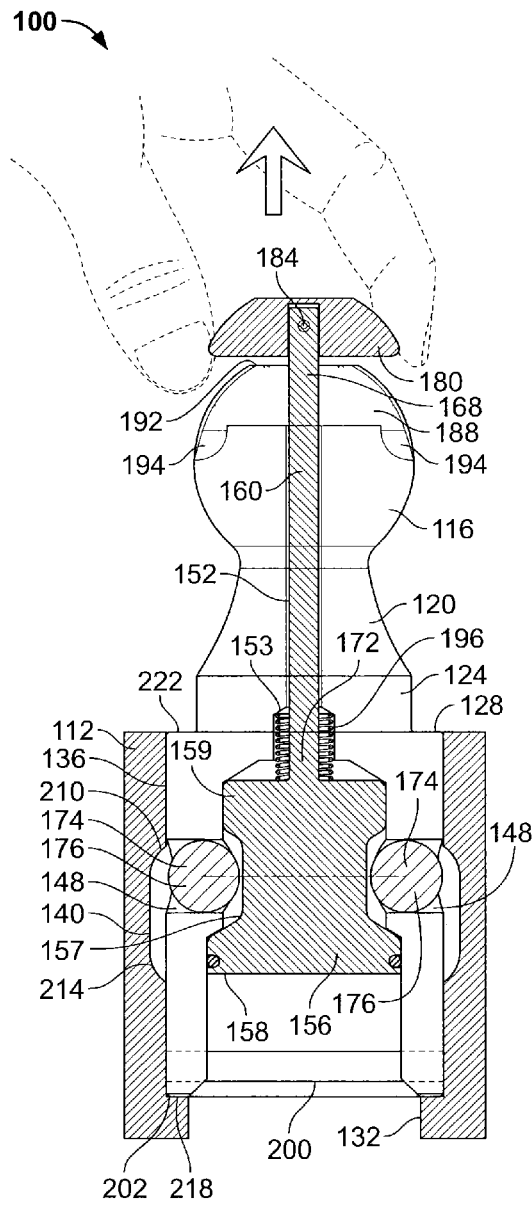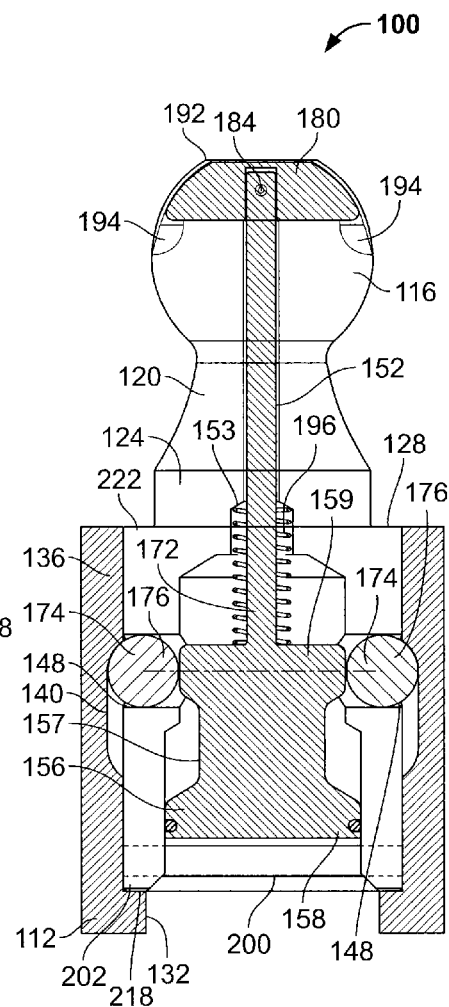
FIG. 6
FIG. 7

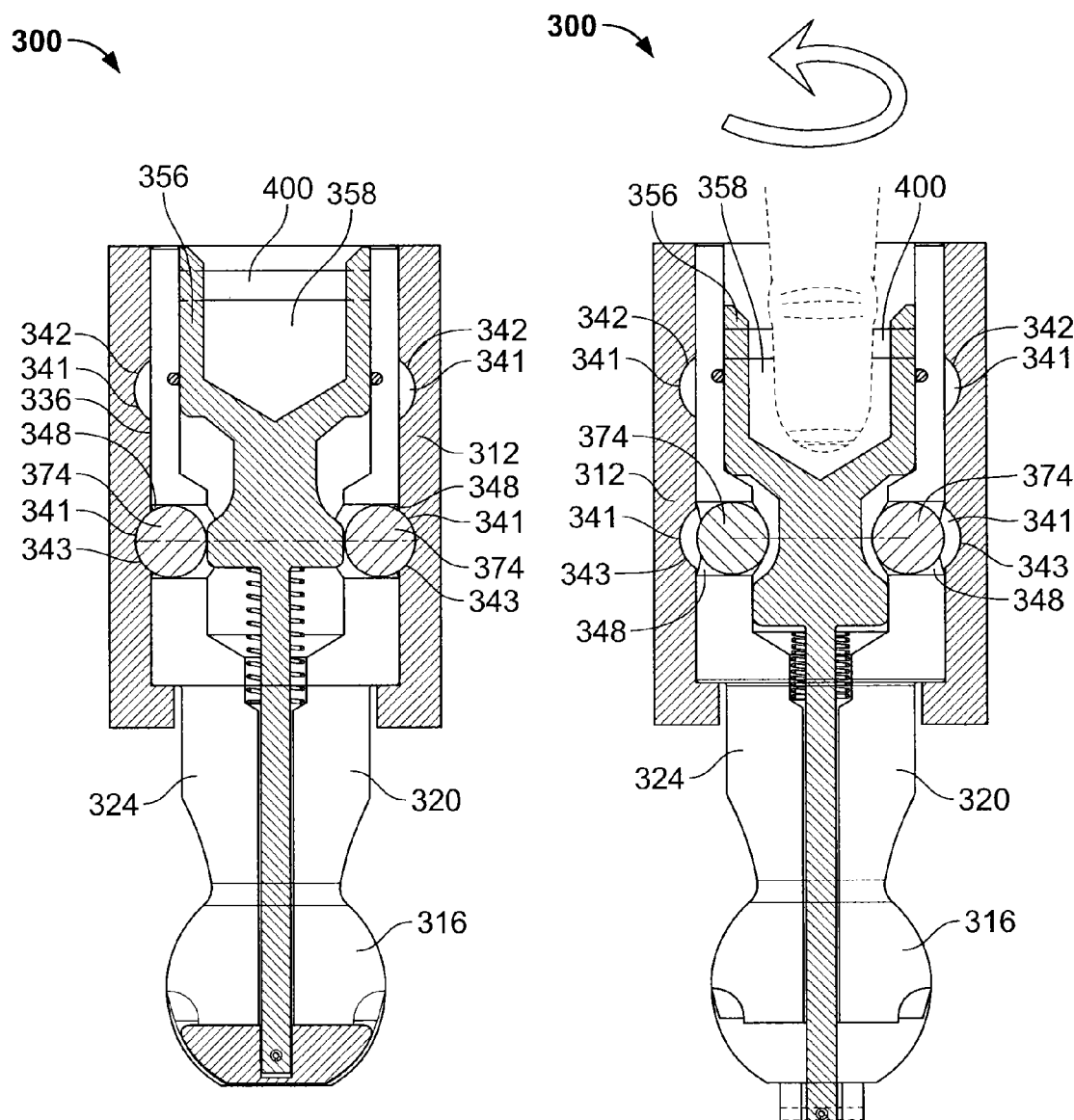

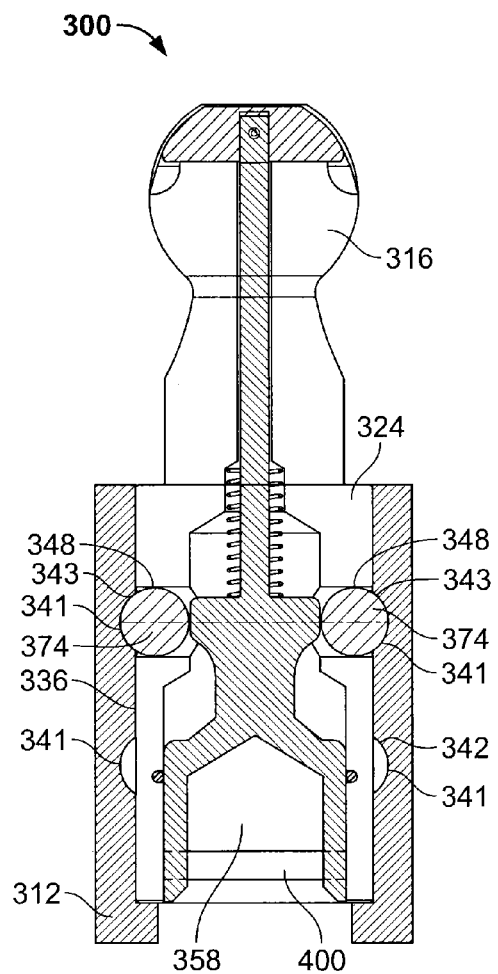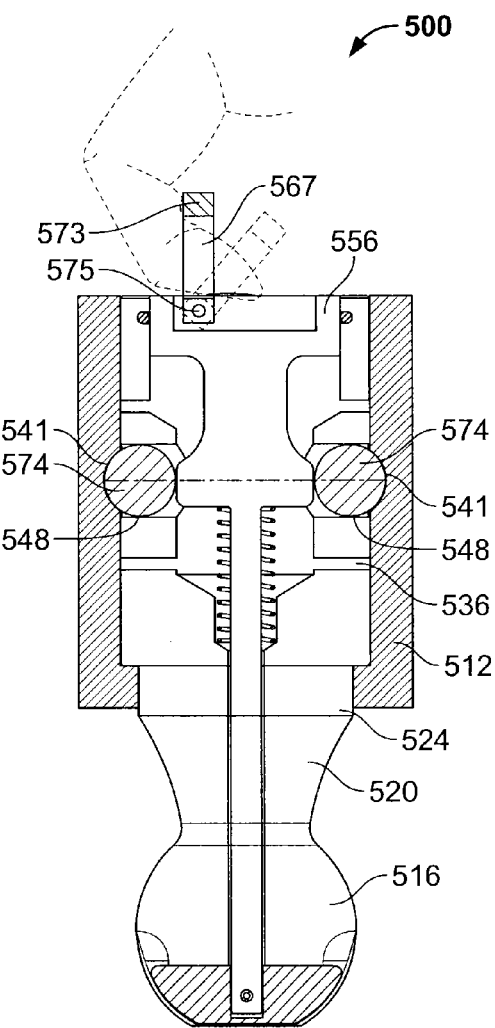
FIG. 12
FIG. 13

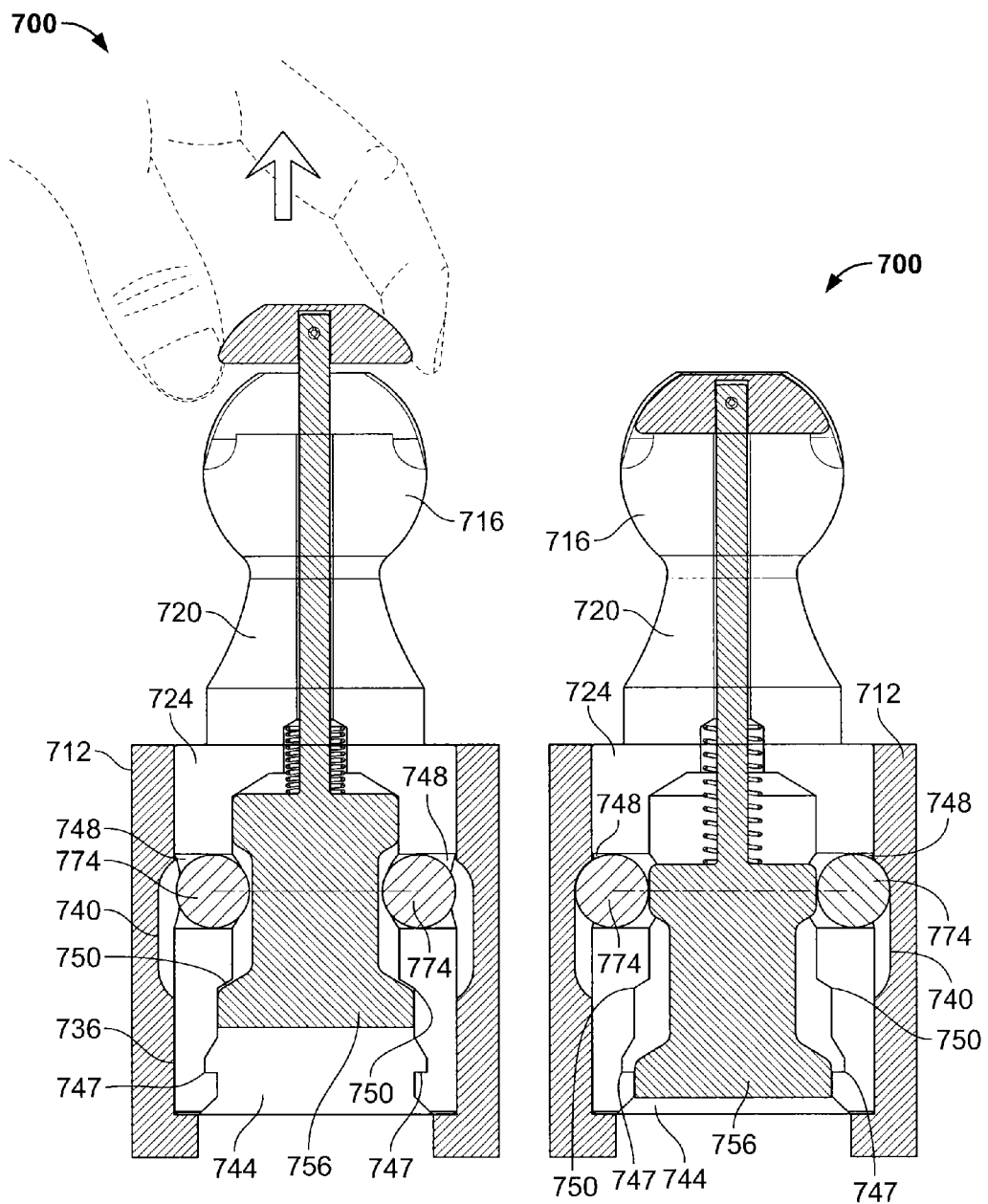

GOOSENECK HITCH BALL

CROSS-REFERENCE TO RELATED APPLICATION

This application is a continuation of U.S. patent application Ser. No. 13/833,789, filed Mar. 15, 2013, entitled "Gooseneck Hitch Ball," which is hereby incorporated by reference in its entirety.

FIELD OF INVENTION

This application relates to a hitch ball and more particularly to a self-contained storable and removable gooseneck hitch ball assembly.

BACKGROUND

Many vehicles are designed to transport freight, goods, merchandise, personal property, and other such cargo. Often such vehicles are arranged to tow a trailer by attaching the trailer to the towing vehicle, such as through the use of a hitch assembly. Typically, a trailer hitch is utilized to connect a towed vehicle or trailer to a towing vehicle, such as a truck, for example.

There are many different types of trailer hitches in the art that may be attached to the towing vehicle in a variety of ways, depending on the type of hitch. Some of the most common types of hitches include gooseneck, fifth wheel, rear mount, and the like. Frequently, trailers are connected to a towing vehicle by way of a ball hitch secured to the towing vehicle and a ball socket coupling mechanism on the towed vehicle that mounts over the ball. This configuration allows for the trailer to pivot behind the towing vehicle.

Ball and socket-type towing mechanisms are used to tow various vehicles, such as trailers, mobile homes, other non-operating vehicles, and the like. The socket to hitch ball connection allows relative movement between the towing vehicle and the trailer as the towing vehicle makes turns, traverses uneven or rough terrain, and passes along inclining and declining roadways.

The hitch ball or member of some hitches, such as gooseneck hitch, for example, is commonly mounted in the bed of a towing vehicle, such as a pickup truck, near the longitudinal centerline of the bed. This may allow the weight of the trailer to be generally distributed between the tires on the two sides of the pickup truck. Typically, a sub-frame assembly, such as a hitch, is secured to the towing vehicle. The ball member is attached or otherwise secured to the hitch for use in towing the towed vehicle.

This type of hitch is often secured to the truck structure in an opening cut in the bed of the truck, so that a substantial portion of the hitch attachment is located below the bed of the truck. In addition, the ball member may typically be removed to ensure that the use of the bed is not substantially hindered by the presence of the ball.

These systems, however, suffer from many disadvantages. It is often very difficult to remove the hitch ball from the hitch system. In many systems, removing the hitch ball requires a user to access the frame of the towing vehicle under the load bed. This is often very difficult and time consuming. Further, still other systems require users to access portions of the system in the wheel well or under the frame of the vehicle. Again, this is often difficult to do and can be very messy for the user. Similarly, other systems often require the use of a separate handle or mechanism to remove the hitch ball. These handles or other mechanism are often inaccessible or otherwise are lost by the user making it very inconvenient to use.

Once removed a suitable location for the hitch ball is often difficult to find. Many users merely store the hitch ball in a glove compartment, behind a seat, underneath a seat, or in a storage box within the towing vehicle. This takes away from the available storage space within the towing vehicle. Moreover, the hitch ball may be dirty and it may be undesirable to put such hitch ball inside the towing vehicle. For those systems that utilize storable hitch balls, there is often a lack of sufficient clearance available to use such systems with many of the new towing vehicle, especially when they are in the stowed position.

Therefore, there is a need for an improved hitch ball system. There is a need for a hitch ball that is easily removable and easily storable. There is a need for such storage to be efficient, easily accessible, and appropriately located so as to not take away the available storage within the interior of the towing vehicle. Further still, there is a need for a self-contained hitch ball storage system that has a compact storable profile.

SUMMARY

A hitch ball is shown and described. The hitch ball may include a ball member, a body extending from the ball member, and a locking member in communication with the body. The hitch ball may also include a first release mechanism positioned in the ball member, the first release mechanism operatively coupled with the locking member, where positioning the first release mechanism in an first direction positions the locking member in a disengaged position, and a second release mechanism positioned in the body, the second release mechanism operatively coupled with the locking member, where positioning the second release mechanism in a second direction positions the locking member in the disengaged position.

A hitch ball assembly may include a socket, a ball member insertable within the socket, and a body extending from the ball member, the body insertable within the socket. The hitch ball assembly may also include a release mechanism, and a locking member in operative communication with the release mechanism, the release mechanism accessible from both of the ball member and body, where the release member positions the locking member from a first position engaged with the socket and a second position disengaged from the socket.

A hitch ball may include a ball member configured for insertion into a socket of a hitch assembly, and a body extending from the ball member, the body configured for insertion into the socket of the hitch assembly. The hitch ball may also include a locking member located in the body, the locking member moveable between a first engaged position and a second disengaged position, where the locking member in the first position locks the ball member in both upright and inverted positions in the socket.

BRIEF DESCRIPTION OF THE DRAWINGS

Operation of the invention may be better understood by reference to the following detailed description taken in connection with the following illustrations, wherein:

FIG. 6 is a cross-sectional view of the hitch ball assembly being released from the locked position while in the operative position.

FIG. 7 is a cross-sectional view of the hitch ball assembly in the locked and operative positions.

FIG. 8 is a cross-sectional view of embodiments of a hitch ball assembly in stored and locked positions.

FIG. 9 is a cross-sectional view of the hitch ball assembly of FIG. 8 being released from the locked position while in the stored position.

FIG. 12 is a cross-sectional view of the hitch ball assembly of FIG. 8 in the locked and operative positions.

FIG. 13 is a cross-sectional view of embodiments of a hitch ball assembly in locked and stored positions with a handle being engaged.

FIG. 24 is a cross-sectional view of the hitch ball assembly of FIG. 20 being released from the locked position while in an operative position.

FIG. 25 is a cross-sectional view of the hitch ball assembly of FIG. 20 being in the locked and operative positions.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

The hitch ball assembly 100 may be selectively secured to a hitch receiver 102, such as by way of a non-limiting example, a gooseneck hitch assembly, secured to a towing vehicle 104. The hitch ball assembly 100 may be secured to and removed from the hitch receiver 102 of the towing vehicle 104 as described below. Further, a towed vehicle coupler assembly (not shown), such as by way of a non-limiting example, a gooseneck coupler, may be selectively secured to the hitch ball assembly 100 in any appropriate manner.

Figure 1:
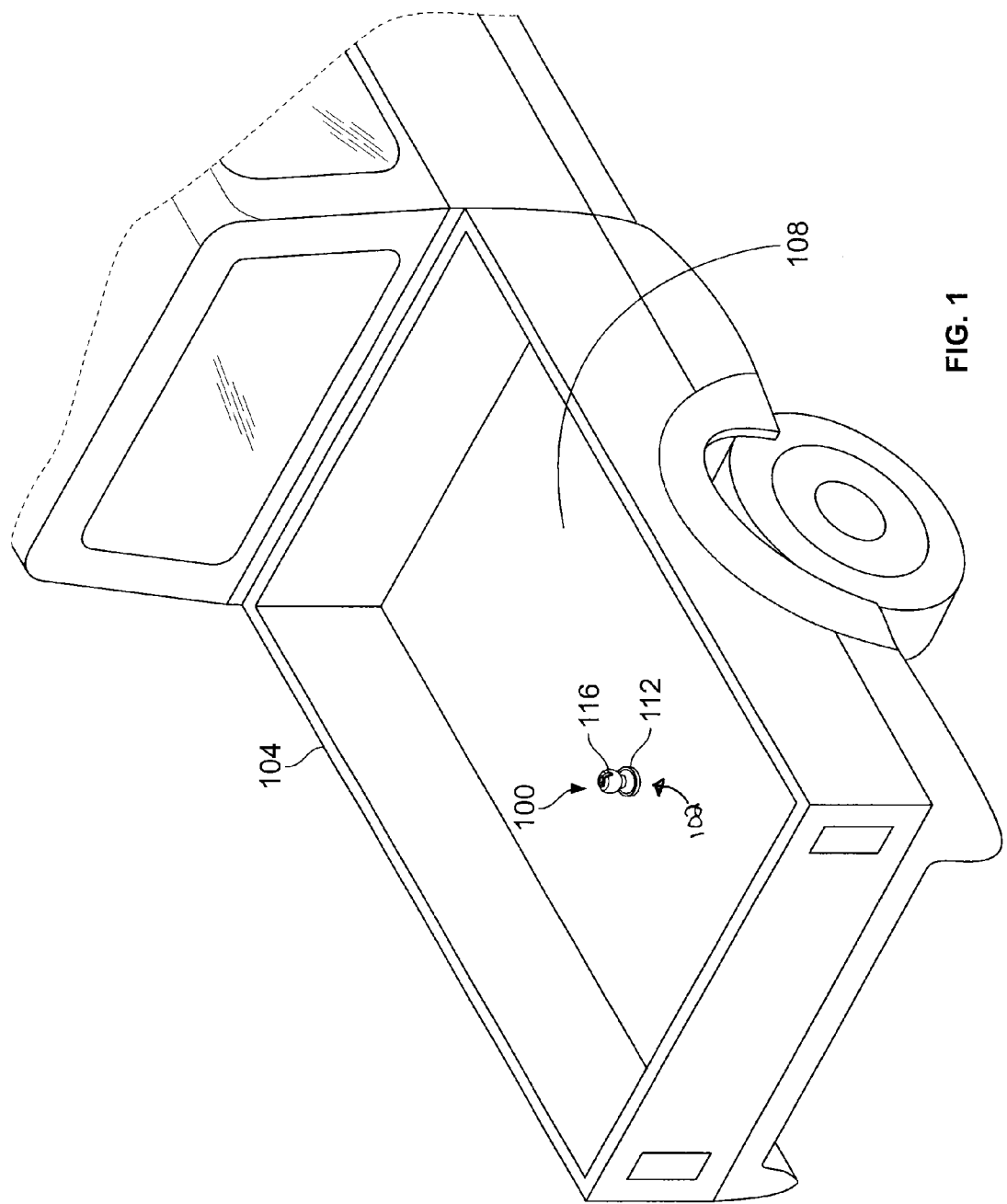
FIG. 1 is a perspective view of a reversible hitch ball assembly in an operative position in a load bed of a towing vehicle.

Moreover, while the present hitch ball assembly 100 may be described in the context of towing assemblies in association with a vehicle or trailer, however, it will be appreciated that the hitch ball assembly 100 may be used in any variety of contexts, and, as such, any reference to towing assemblies or use with trailer and vehicles is illustrative in nature and not restrictive in any way. In addition, the description of the embodiments provided may refer to the use of specific options or materials; however, this should not limit the scope of the invention as claimed. Those skilled in the art will understand that the above descriptions should only be taken as illustrative A hitch ball assembly 100 is shown in FIG. 1 operatively secured to a load bed 108 of the towing vehicle 104. The hitch ball assembly 100 may be selectively positioned from a storable position, such as shown in FIGS. 2-5 to an operative position as shown in FIGS. 1 and 6-7. The hitch ball assembly 100 being in the storage position may result in the load bed 108 of the towing vehicle 104 being generally free from obstruction. The hitch ball assembly 100 being in the operative position may permit operative engage of a coupler assembly, such as by way of a non-limiting example, a gooseneck coupler of a towed vehicle to be operatively attached thereto.

As shown in FIG. 1, the hitch ball assembly 100 may be removably secured to the hitch receiver 102 on the towing vehicle 104 in any appropriate manner. By way of a non-limiting example, the hitch ball assembly 100 may be selectively secured to a hitch receiver as shown and described as being part of an under bed gooseneck hitch mounting system shown and described in U.S. Patent Application Serial Number 20100109285, which is hereby incorporated by reference. In such embodiments, the hitch ball assembly 100 may be insertable into a hitch ball socket 112 of the under bed hitch mounting system as described in more detail below.

The hitch ball assembly 100 may include a ball member 116 and a body 120. The ball member 116 may be shaped to receive a corresponding socket (not shown) of a towed vehicle, such as a gooseneck coupler. It is to be understood that the ball member 116 may be of any appropriate or conventional shape and size in the towing field. In some embodiments, the ball member 116 may be a separate component from the body 120 that may be attached thereto through any appropriate manner, including, without limitation, fastening, adhering or welding. In other embodiments, the ball member 116 may be formed with the body 120 as a monolithic member, including, without limitation, by casting therewith.

The body 120 may include an insert portion 124, which may be attached as a separate component or may be formed as a monolithic member. The insert portion 124 may be of any appropriate shape or size, such as being shaped for insertion into the hitch ball socket 112. Although illustrated as substantially cylindrical in shape, it is to be understood that the insert portion 124 may be shaped to accommodate any type and shape of hitch ball socket 112.

The hitch ball socket 112 may include an upper aperture 128 and a lower aperture 132 relative to the load bed 104 of the towing vehicle 108. In some embodiments, the upper and lower apertures 128, 132 may extend entirely through the hitch ball socket 112. The hitch ball socket 112 may further include an inner portion 136 that generally extends between the upper and lower apertures 128, 132. The inner portion 136 may be of any appropriate shape or size, such as a curved or rounded shape, for example. The inner portion 136 may include a groove 140 of any appropriate shape formed therein. By way of a non-limiting example, the groove 140 may be a generally annular groove formed therein. The present teachings, however, are not limited to an annular groove. The groove 140 may be a plurality of notches formed around the circumference of the inner portion 136. The notches may be formed at predetermined angles, such as every 90 degrees along the inner portion 136.

The insert portion 124 may also include a cavity 144. The cavity 144 may be positioned at any appropriate location within the insert portion 124. The cavity 144 may be of any appropriate shape or size, such as a cylindrical shape, by way of a non-limiting example. The insert portion 124 may also include at least one aperture, such as a pair of apertures 148 shown in FIGS. 4-7. The apertures 148 may be located in any appropriate position on the insert portion 124, such as by way of a non-limiting example, the apertures 148 may be located within the groove 140 when the hitch ball assembly 100 is inserted into the hitch ball socket 112 regardless of whether in the operative or stowed position. The apertures 148 may be of any appropriate shape or size, such as a cylindrical shape, for example.

The hitch ball assembly 100 may further include a passageway 152. The passageway 152 may be of any appropriate shape or size, such as a cylindrical shape, for example. The passageway 152 may extend through the ball member 116 and body 120 into the cavity 144 within the insert portion 124. The passageway 152, apertures 148 and cavity 144 may be formed monolithically with the body 120 and ball member 116, such as through casting, or may be formed therein through a subsequent operation.

Further, the hitch ball assembly 100 may include a lip 153 in operative communication with and position between the passageway 152 and cavity 144. In some embodiments, the lip 153 may form part of the passageway 152. The lip 153 may be formed with either or both of the cavity 144 and the passageway 152 in any appropriate manner.

The hitch ball assembly 100 may also include a plunger 156 of any appropriate shape and made of any appropriate material, including, without limitation rubber, plastics, metal or a combination of such. The plunger 156 may be located within the cavity 144 of the insert portion 124. The plunger 156 may be of any appropriate shape or size. The plunger 156 may include a generally annular slot 157 formed therein. The annular slot 157 may generally extend around a circumference of the plunger 156. The plunger 156 may also include end portions 158, 159 axially positioned apart from one another.

The hitch ball assembly 100 may also include an elongated member 160 positioned within the ball member 116, body 120 and insert portion 124. The elongated member 160 may be of any appropriate shape or size, such as a generally cylindrical shape, by way of a non-limiting example. The elongated member 160 may include a first end 168 and a second end 172. The second end 172 may be connected to the plunger 156 in any appropriate manner. In some embodiments, the elongated member 160 may be formed with the plunger 156 as a monolithic member. In other embodiments, the elongated member 160 may be attached with the plunger 156 through a subsequent operation.

The hitch ball assembly 100 may further include a locking member 174 of any appropriate configuration. The locking member 174 may be configured to engage with the hitch ball socket 112 or more particularly the groove 140 formed therein to engage generally lock the hitch ball assembly 100 within the hitch ball socket 112. In some embodiments, the locking member 174 may include a pair of ball bearings 176 operatively engaged with the apertures 148 of the insert portion 124. In such embodiments, the ball bearings 176 may be of a shape and size that they may extend into and outward from the apertures 148. The ball bearings 176 may extend outward of the apertures 148 and into the groove 140. The engagement of the ball bearings 176 and the groove 140 may generally prevent removal of the hitch ball assembly 100 from the hitch ball socket 112. The ball bearings 176 may further extend within the apertures 148 generally releasing the ball bearings 176 from engagement with the groove 140, or more specifically, within the annular slot 157. The hitch ball assembly 100 may then be released from the hitch ball socket 112. While two ball bearings 176 and two apertures 148 are shown, any number of such may be used without departing from the present teachings. By way of a non-limiting example, three ball bearings 176 and three apertures 148 may be utilized.

As best shown in FIGS. 4-7 and 26-27, the hitch ball assembly 100 may also include a head or handle 180. The handle 180 may be provided to allow a user to selectively adjust the hitch ball assembly 100 between the locked and unlocked positions as described in more detail below. The handle 180 may be of any appropriate configuration, including, without limitation of a shaped and size to allow the user to easily grip the handle 180. In some embodiments, the handle 180 may be attached to the first end 168 of the elongated member 160 by any appropriate means, such as through welding, using adhesives or a fastener. By way of a non-limiting example, the first end 168 of the elongated member 160 may be attached with the handle 180 such as through a roll pin 184.

The ball member 116 may also include a recess 188 and an upper surface 192. The recess 188 may be provided in the ball member 116 so that when the hitch ball assembly 100 is in the locked position, the handle 188 may be generally flush with (or positioned below) the upper surface 192 of the ball member 116. This may allow the ball member 116 to remain engageable with coupler arrangement. Moreover, the handle 180 fitting within the recess 188 may provide an aesthetically pleasing finish to the ball member 116. The ball member 116 may also include an additional groove 194 formed therein. The groove 194 to facilitate easy access to the handle 180. The grooves 194 may be shaped and sized to allow fingers of the user to appropriately access the handle 180 during operation of the hitch ball assembly 100.

As shown in FIGS. 2-7, the hitch ball assembly 100 may include a biasing member 196. The biasing member 196 may be of any appropriate configuration, such as a spring or more specifically a coil spring, by way of a non-limiting example. The biasing member 196 may be positioned along the elongated member 160, or more specifically, the biasing member 196 may generally circumscribe the elongated member 160. The biasing member 196 may be positioned between the plunger 156 and the lip 157. The biasing member 196 may urge the plunger 156 toward the locking members 174 and may urge the handle 180 into the recess 188. Such a configuration may ensure that while the hitch assembly 100 is in the locked position the handle 180 may not interfere with the connection to the coupler arrangement of the towed vehicle.

As shown in FIGS. 2-7, the body 120 may include a second handle 200. The second handle 200 may be attached to and positioned in proximity to a bottom portion 202 of the body 120 and within the cavity 144. The second handle 200 may be adjacent to the plunger 156 when the hitch ball assembly 100 is in the locked position. The second handle 200 may be of any appropriate construction. The second handle 200 may be of a configuration that allows a user to operatively position the plunger 156 from the locked position to the unlocked position, i.e., the second handle 200 is of a configuration to allow a user access to the plunger 156 in order to overcome the biasing force applied by the biasing member 196 to move the plunger to the unlocked position from the locked position. The second handle 200 may include a pin 206 attached with the bottom portion 202 of the body 120. The pin 206 may be attached with the body 120 in any appropriate manner, such as by way of non-limiting examples, through fastening, welding, adhesives or a press fit.

Figures 2, 3:
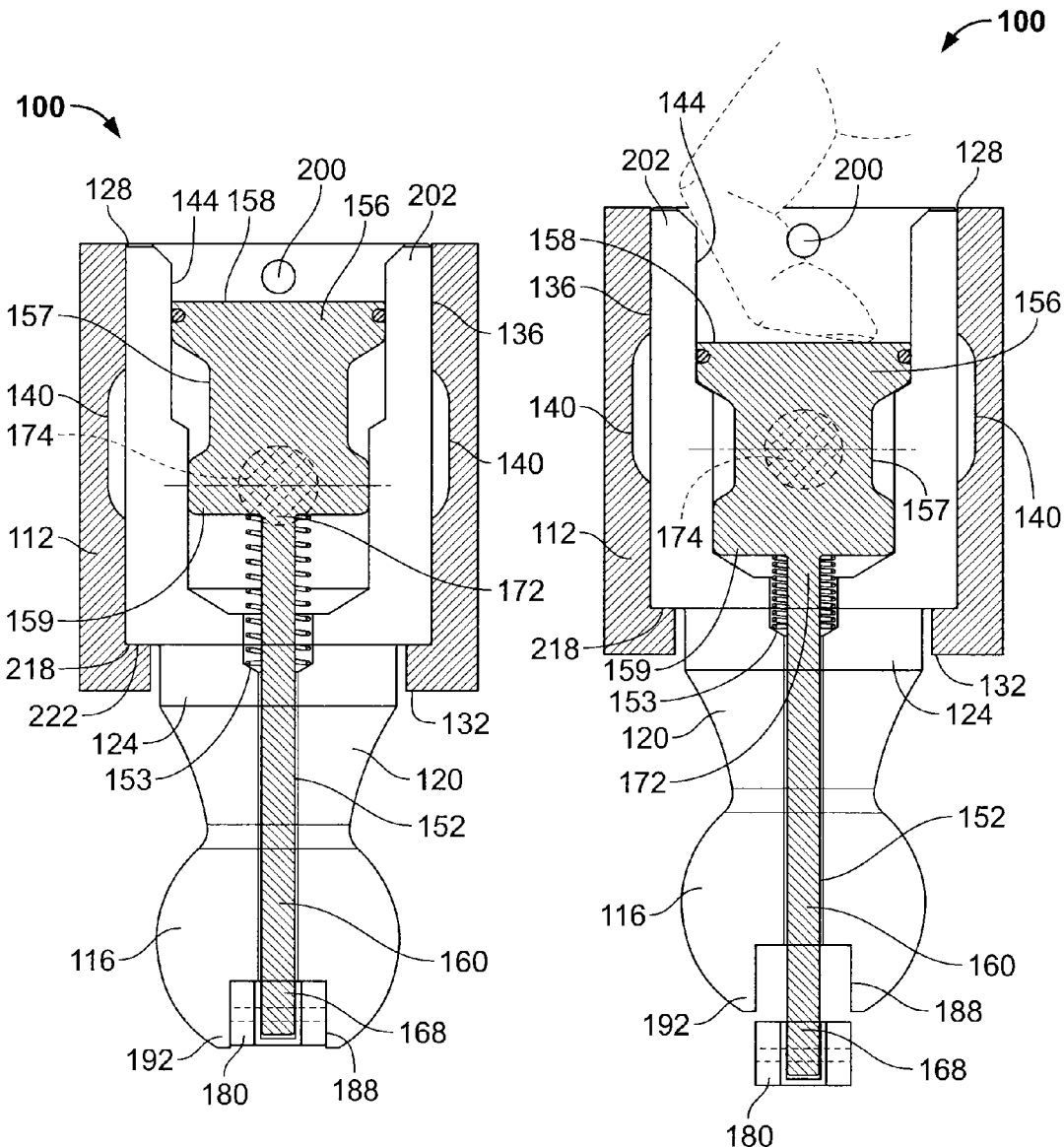
FIG. 2 is a cross-sectional view of the hitch ball assembly in stored and locked positions.
FIG. 3 is a cross-sectional view of the hitch ball assembly being released from the locked position while in the stored position.
Figures 4, 5:
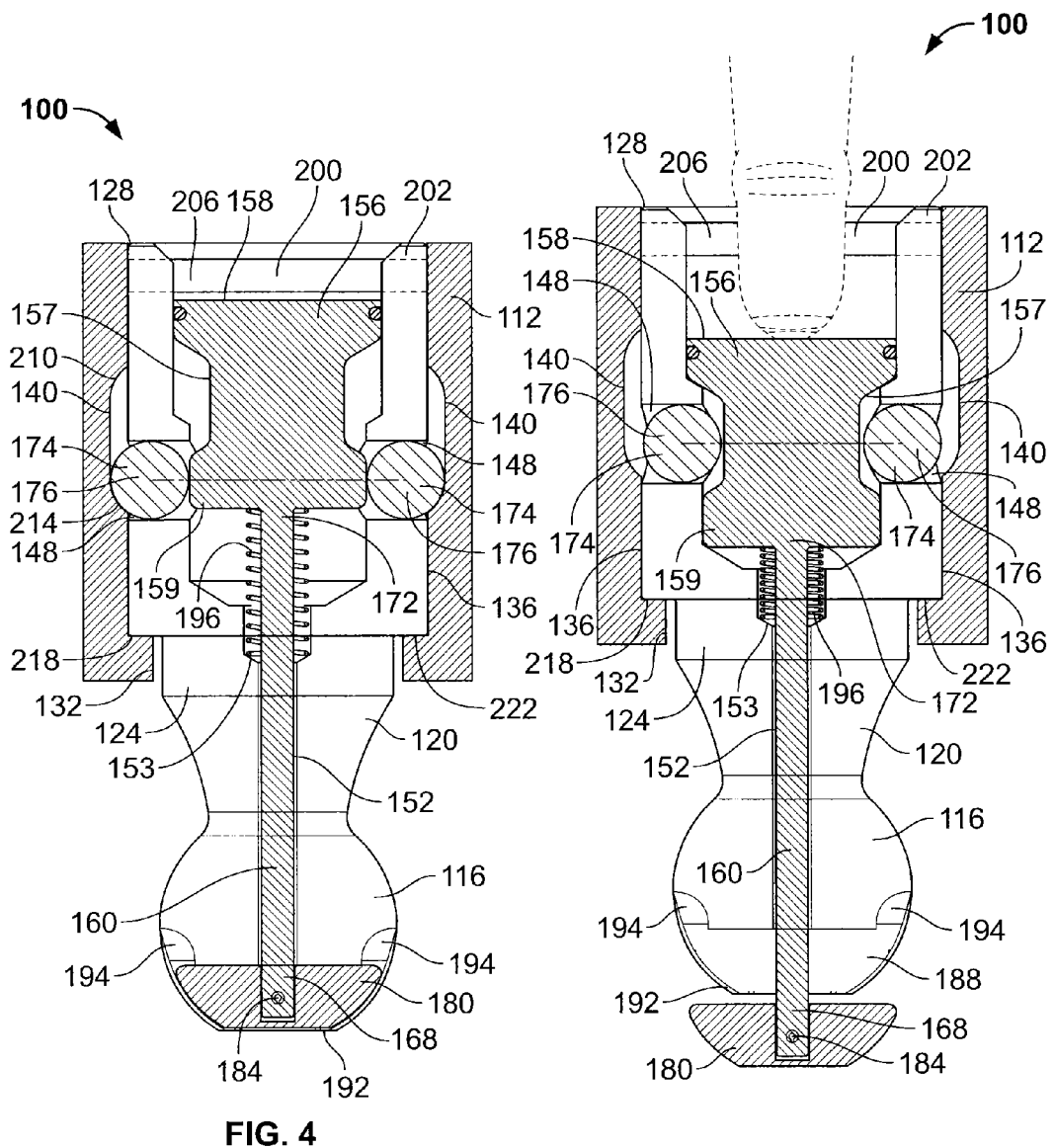
FIG. 4 is a second cross sectional view of the hitch ball assembly being in the stored and locked positions.
FIG. 5 is a second cross-sectional view of the hitch ball assembly being released from the locked position while in the stored position.
Figures 10, 11:
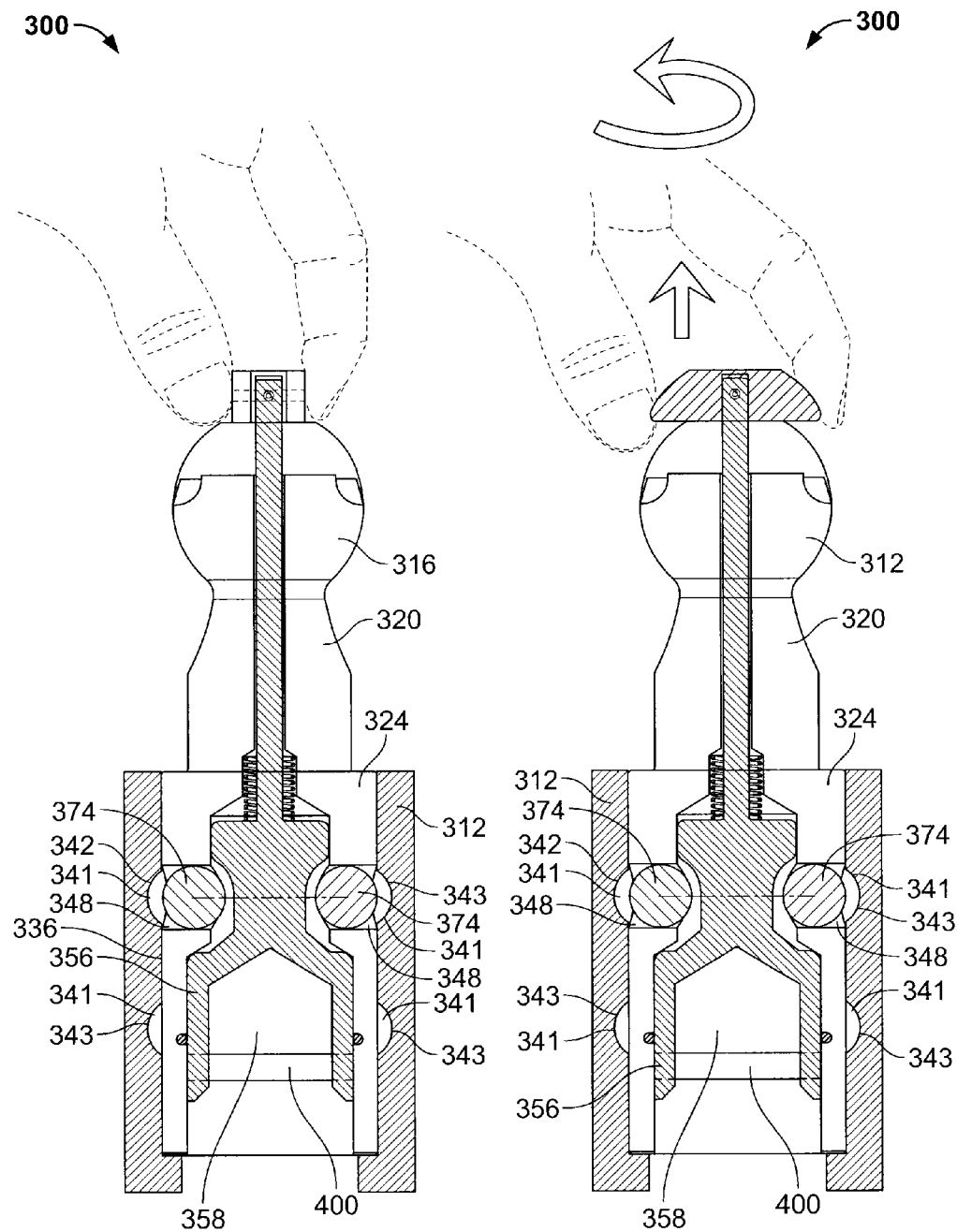
FIG. 10 is a cross-sectional view of the hitch ball assembly of FIG. 8 being released from the locked position while in an operative position.
FIG. 11 is a second cross-sectional view of the hitch ball assembly of FIG. 8 being released from the locked while in the operative position.

In operation, the passageway 152 and cavity 144 may allow the elongated member 160 and the plunger 156 to be selectively engaged with the locking members 174 between a locked position, as shown in FIGS. 2, 4 and 7, and a released or unlocked position as shown in FIGS. 3, 5, and 6. In the locked position, the ball member 116 may extend upward into the load bed 104 of the towing vehicle 108. The plunger 156 may engage the locking members 174 to push the locking members 174 outwardly into the groove 140 of the body via the apertures 148. In turn, the locking members 147 may engage, for example, the inner portion 136 of the hitch ball socket 112 to prevent the hitch ball assembly 100 from being removed from the hitch ball socket 112. More specifically, the locking members 147 may engage a top or bottom portion 210, 214, as applicable, to prevent the hitch ball assembly 100 from being removed from the hitch ball socket 112. Such a configuration may ensure that the hitch ball assembly 100 remains in the locked position to prevent disconnection from the hitch ball socket 112.

In the released or unlocked position, as shown in FIGS. 3, 5, and 6, the handle 180 may be withdrawn upwardly from the recess 188 so that the plunger 156 may disengage from the locking members 174. Accordingly, the locking members 174 may disengage from the hitch ball socket 112, or more specifically from the groove 140, and return toward the center of the inner portion 136. In the released position, the handle 180 may protrude above the upper surface 192 of the ball member 116 to prevent a socket member (not shown) from being connected thereto. Further, the handle 180 may be rotated approximately 90 degrees, which may result in the handle 180 engaging with the upper surface 192. This may result in the hitch ball assembly 100 remaining in the unlocked or disengaged position so that the user need not continue to hold the handle 180 in the disengaged or unlocked position.

Once in the released potion shown in FIG. 6, the hitch ball assembly 100 may be removed from the hitch ball socket 112. The hitch ball assembly 100 may be inverted 180 degrees so that the ball member 116 may extend down toward the hitch ball socket 112 and the load bed 104. The hitch ball assembly 100 with the ball member 116 positioned downward may be inserted into the hitch ball socket 112. Upon insertion, the body 120 and ball member 116 may extend entirely below and within the hitch ball socket 112 below the load bed 104. Once inserted, the plunger 156 may engage the locking members 174 to push the locking members 174 outwardly into the groove 140 of the body via the apertures 148. In turn, the locking members 147 may engage, for example, the inner portion 136 of the hitch ball socket 112 to prevent the hitch ball assembly 100 from being removed from the hitch ball socket 112. More specifically, the locking members 147 may engage a top or bottom portion 210, 214, as applicable, to prevent the hitch ball assembly 100 from being removed from the hitch ball socket 112. This may ensure that the hitch ball assembly 100 with the body 120 and ball member 116 remain in the locked position to prevent disconnection from the hitch ball socket 112.

Further, the body 120 may be generally cylindrical in shape. Typical hitch balls include a flange member adapted to rest on the hitch ball socket. The body 120 of the present teachings, however, does not include this flange. The lack of this flange permits the hitch ball assembly 100 to be insertable into the hitch ball socket 112 in both of the stowed and operative positions as shown in FIGS. 2-7. Instead of a flange, the hitch ball socket 112 may include a bottom wall 218 axially displaced from the lead bed 104 of the towing vehicle 108. In such embodiments, the body 120 of the hitch ball assembly 100 may include a top shoulder 222. The top shoulder 222 may generally be aligned with the hitch ball socket 112 when the hitch ball assembly 100 is in the operative position. When the hitch ball assembly 100 is positioned to the stowed position, the top shoulder 222 may engage the bottom wall 218. The engagement between the top shoulder 222 and the bottom wall 218 may generally prevent the hitch ball assembly 100 from moving past and through the lower aperture 132 of the hitch ball socket 112. This construction, therefore, may obviate the need for the flange of other hitch balls.

Similarly, when the hitch ball assembly 100 is in the operative position as shown in FIGS. 6-7, the bottom portion 202 of the insert portion may engage the bottom wall 218. This engagement of the bottom portion 202 with the bottom wall 218 may generally prevent the hitch ball assembly 100 from moving past and through the lower aperture 132 of the hitch ball socket 112.

When the hitch ball assembly 100 is in the stowed position, the user may insert his or her finger into the cavity 144 in the body 120 and grasp or otherwise engage the second handle 200. As shown in the drawings, the user may insert his or her finger into the opening and grasp the pin 206. As the user inserts his or her finger, the user may depress the plunger 156 in a downward direction toward the ball member 116. As the plunger 156 moves downward, the plunger 156 may disengage from the locking members 174. The locking members 174 may disengage from the hitch ball socket 112, or more specifically from the groove 140, and return toward the center of the inner portion 136. The user may then pull the pin 206 in an axial direction away from the load bed 104 and lift the hitch ball assembly 100 out of the hitch ball socket 112. Further, the second handle 200 may be rotated approximately 90 degrees, which may result in the handle 180 engaging with the upper surface 192. This may result in the hitch ball assembly 100 remaining in the unlocked or disengaged position so that the user need not continue to hold the second handle 200 in the disengaged or unlocked position.

Additional embodiments of a hitch ball assembly according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired hitch ball assembly without departing from the spirit and scope of the present teachings.

As shown in FIGS. 8-12, a hitch ball assembly 300 may have a construction generally similar to that of the hitch ball assembly 100. The hitch ball assembly 300 may include a ball member 316 and a body 320. The ball member 316 may be shaped to receive a corresponding socket (not shown) of a towed vehicle, such as a gooseneck coupler. The body 320 may include an insert portion 324 of any appropriate shape or size, such as being shaped for insertion into a hitch ball socket 312, as shown in FIGS. 8-12.

The hitch ball socket 312 may include an inner portion 336 that may have a pair of retaining grooves 341 of any appropriate shape formed therein. By way of a non-limiting example, the retaining grooves 341 may be generally annular grooves axially spaced from one another within the inner portion 336. The present teachings, however, are not limited to the annular grooves. The grooves 341 may be a plurality of notches formed around the circumference of the inner portion 336. The notches may be formed at predetermined angles, such as every 90 degrees along the inner portion 336. As shown in FIGS. 8-12, the inner portion 336 may include an upper groove 342 and a lower groove 343.

The hitch ball assembly 300 may include a pair of locking members 374 of any appropriate configuration. The locking members 374 may be configured to engage with a hitch ball socket 312 or more particularly at least one of the retaining grooves 341 formed therein to engage and generally lock the hitch ball assembly 300 within the hitch ball socket 312. In some embodiments, the locking members 374 may include a pair of ball bearings operatively engaged with apertures 348 of the insert portion 324. In such embodiments, the locking members 374 may be of a shape and size that they may extend into and outward from the apertures 348. The locking members 378 may extend outward of the apertures 348 and into either of the top or bottom retaining grooves 342, 343. The engagement of the locking members 374 with either of the top or bottom retaining grooves 342, 343 may generally prevent removal of the hitch ball assembly 300 from the hitch ball socket 312. The locking members 374 may further extend within the apertures 348 generally releasing the locking members 374 from engagement with either of the top or bottom retaining grooves 342, 343. The hitch ball assembly 300 may then be released from the hitch ball socket 312.

Further, the hitch ball assembly may include a plunger 356 and a second handle 400. The plunger 356 may operate substantially similar to the plunger 356. Plunger 356, however, may have a cavity 358 formed therein. In such embodiments, the second handle 400 may be operatively attached with the plunger 356. As shown, the cavity 358 may provide space for a user to insert his or her finger to engage the second handle 400.

Operation of the hitch ball 300 may be substantially similar to that described for the hitch ball 100. However, in such embodiments when the hitch ball assembly 300 is in the stowed position shown in FIGS. 8 and 9 the locking members 374 may engage the bottom retaining groove 343. When the hitch ball assembly is in the operative position shown in FIGS. 10 and 11, the locking members 374 may engage the top retaining groove 342. This may retain the hitch ball assembly 300 in the appropriate position relative to the socket 312.

Figures 14, 15:
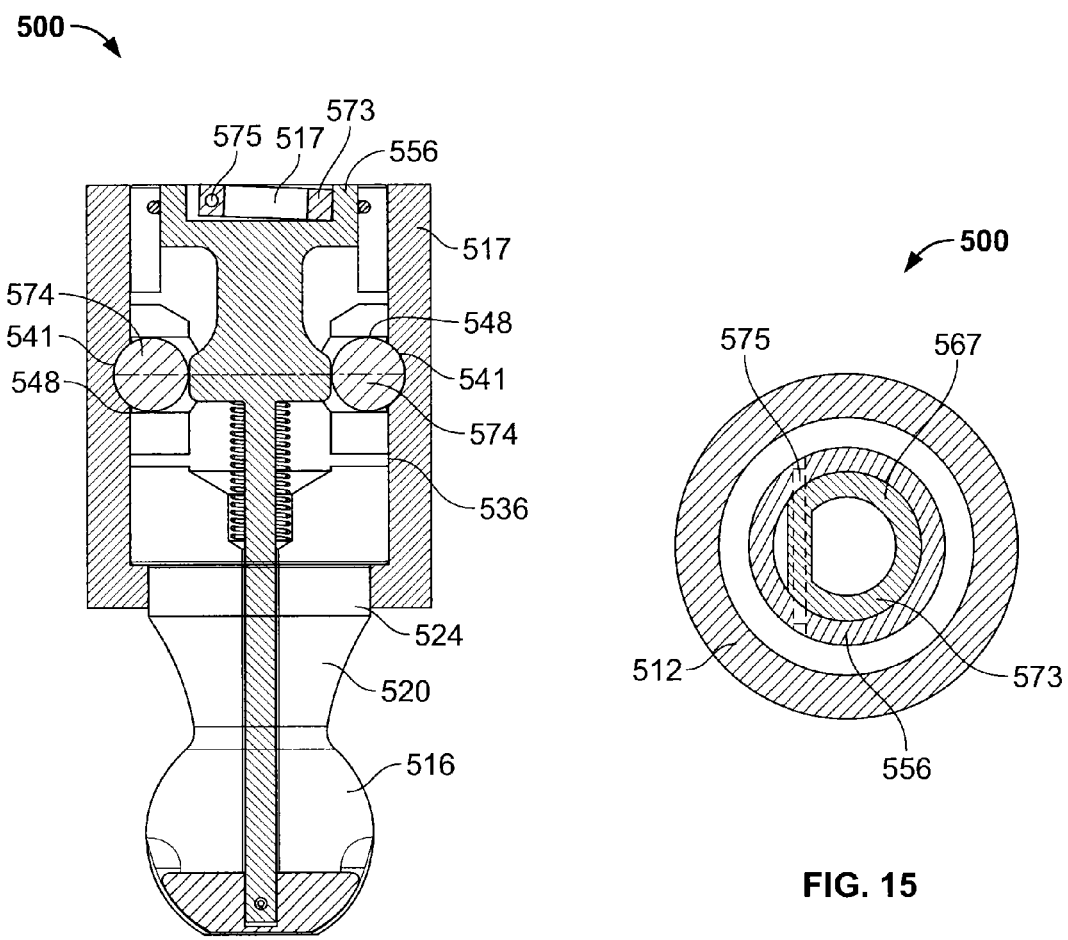
FIG. 14 is a cross-sectional view of the hitch ball assembly of FIG. 13 in the locked and stored positions.
FIG. 15 is a top cross-sectional view of the hitch ball assembly of FIG. 13 in the locked and stored positions.

As shown in FIGS. 13-15, a hitch ball assembly 500 may have a construction generally similar to that of the hitch ball assembly 100 or hitch ball assembly 300. The hitch ball assembly 500 may include a ball member 516 and a body 520. The ball member 516 may be shaped to receive a corresponding socket (not shown) of a towed vehicle, such as a gooseneck coupler. The body 520 may include an insert portion 524 of any appropriate shape or size, such as being shaped for insertion into a hitch ball socket 512, as shown in FIGS. 13-14.

The hitch ball socket 512 may include an inner portion 536 that may have a retaining groove 541 of any appropriate shape formed therein. The hitch ball assembly 500 may also include a pair of locking members 574 of any appropriate configuration. The locking members 574 may be configured to engage with the retaining groove 541 to engage and generally lock the hitch ball assembly 500 within the hitch ball socket 512. In some embodiments, the locking members 574 may include a pair of ball bearings operatively engaged with apertures 548 of the insert portion 524. The locking members 574 may extend within the apertures 548 generally releasing the locking members 574 from engagement with the retaining groove 541. The hitch ball assembly 500 may then be released from the hitch ball socket 512.

Further, the hitch ball assembly may include a plunger 556 and a second handle 567. The plunger 556 may operate substantially similar to the plunger 156 or plunger 356. The handle 567 may be pivotally attached with the plunger 556. In such embodiments, when the user desires to disengage or otherwise unlock the hitch ball assembly 500 from the stowed position in FIGS. 13 and 14, the user may pivot the handle 567 with respect to the plunger 556. As shown in FIG. 15, the handle 567 may include a generally or at least partially circular ring member 573. The ring member 573 may provide a handle 567 that is easy to grasp for the user. The handle 567 may further include a pin member 575 that pivotally attaches the handle 567 or more specifically, the ring member 573 with the plunger 556.

The handle 567 may pivot to a stored position as shown in FIGS. 14 and 15. When a user desires to remove the hitch ball assembly 500 from the stowed position shown in FIG. 14, the user may pivot the handle 567 with respect to the plunger 556. The ring portion 573 may provide an easy gripping surface for the user to operate the hitch ball assembly 500. Operation of the hitch ball 500 may be substantially similar to either or both of the hitch ball 100 and hitch ball assembly 300.

As shown in FIGS. 16-19, a hitch ball assembly 600 may have a construction generally similar to that of the hitch ball assembly 100, 300 or 500. The hitch ball assembly 600 may include a ball member 616 and a body 620. The ball member 616 may be shaped to receive a corresponding socket (not shown) of a towed vehicle, such as a gooseneck coupler. The body 620 may include an insert portion 624 of any appropriate shape or size, such as being shaped for insertion into a hitch ball socket 612, as shown in FIGS. 16-19.

The hitch ball socket 612 may include an inner portion 636 that may have a retaining groove 641 of any appropriate shape formed therein. The hitch ball assembly 600 may also include a pair of locking members 674 of any appropriate configuration. The locking members 674 may be configured to engage with the retaining groove 641 to engage and generally lock the hitch ball assembly 600 within the hitch ball socket 612. In some embodiments, the locking members 674 may include a pair of ball bearings operatively engaged with apertures 648 of the insert portion 624. The locking members 674 may extend within the apertures 648 generally releasing the locking members 674 from engagement with the retaining groove 641. The hitch ball assembly 600 may then be released from the hitch ball socket 612.

Further, the hitch ball assembly may include a plunger 656 and a second handle 667. The plunger 656 may operate substantially similar to any one or any combination of the plungers 156, 356 and 556. The second handle 667 may be attached with the plunger 656 in any appropriate manner, including, without limitation fastening, welding or the like. In such embodiments, the second handle 667 may be formed with the plunger 656 as a monolithic unit. The handle 667 may include a generally looped end 671. The looped end 671 may include an aperture 673 configured to allow a user to insert his or her finger through. The looped end 671 with the aperture 673 may make it easier for a user to grasp.

Figures 16, 17:
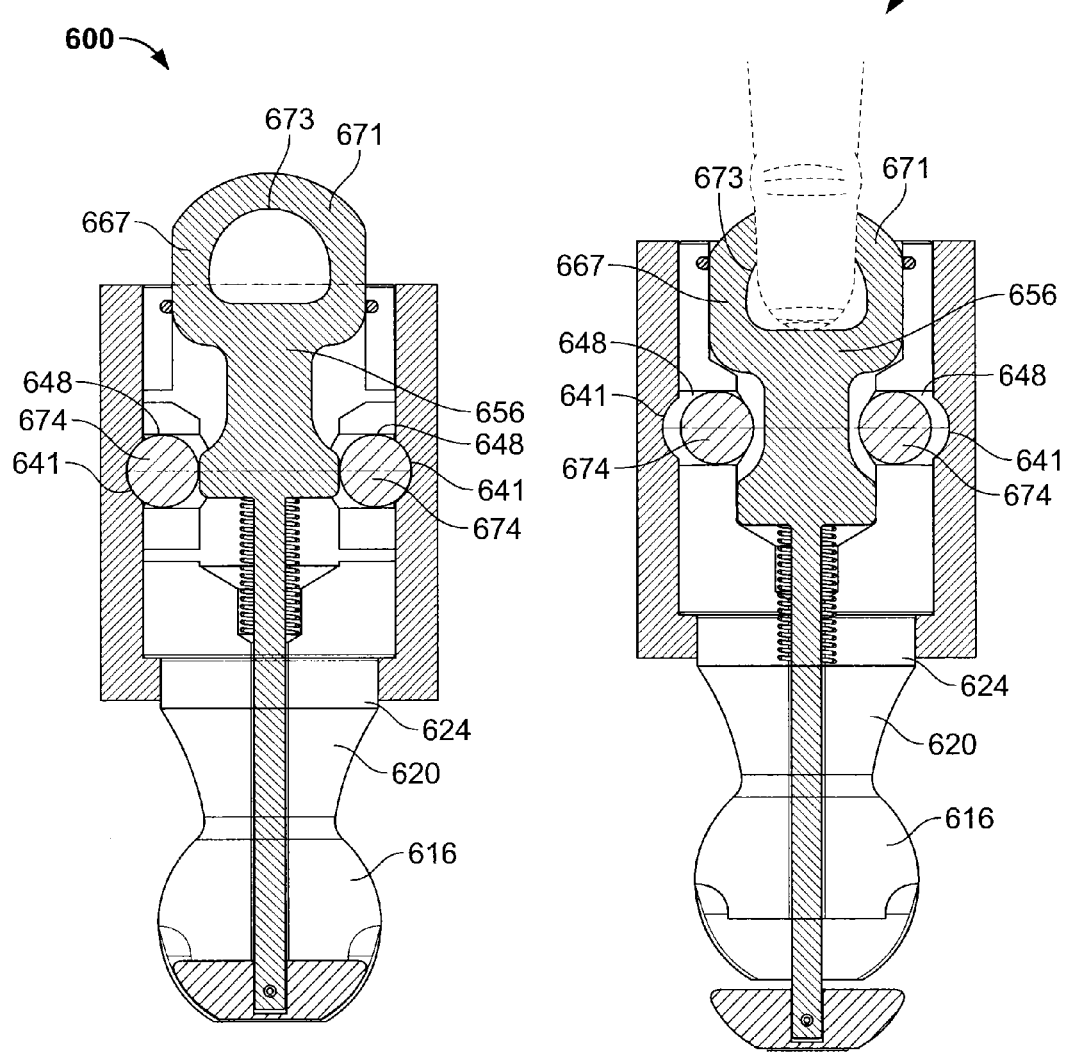
FIG. 16 is a cross-sectional view of embodiments of a hitch ball assembly in locked and stored positions.
FIG. 17 is a cross-sectional view of the hitch ball assembly of FIG. 16 being released from the locked position while in the stored position.

As shown in FIGS. 16 and 17, a portion of the handle 667 may extend upward from the socket 612. This may further make grasping the handle 667 easier. In such embodiments, the user may insert his or her finger into the aperture 673 and may push downward on the handle 667 to release the locking mechanism 674 from engagement, see FIG. 17.

Figures 18, 19:
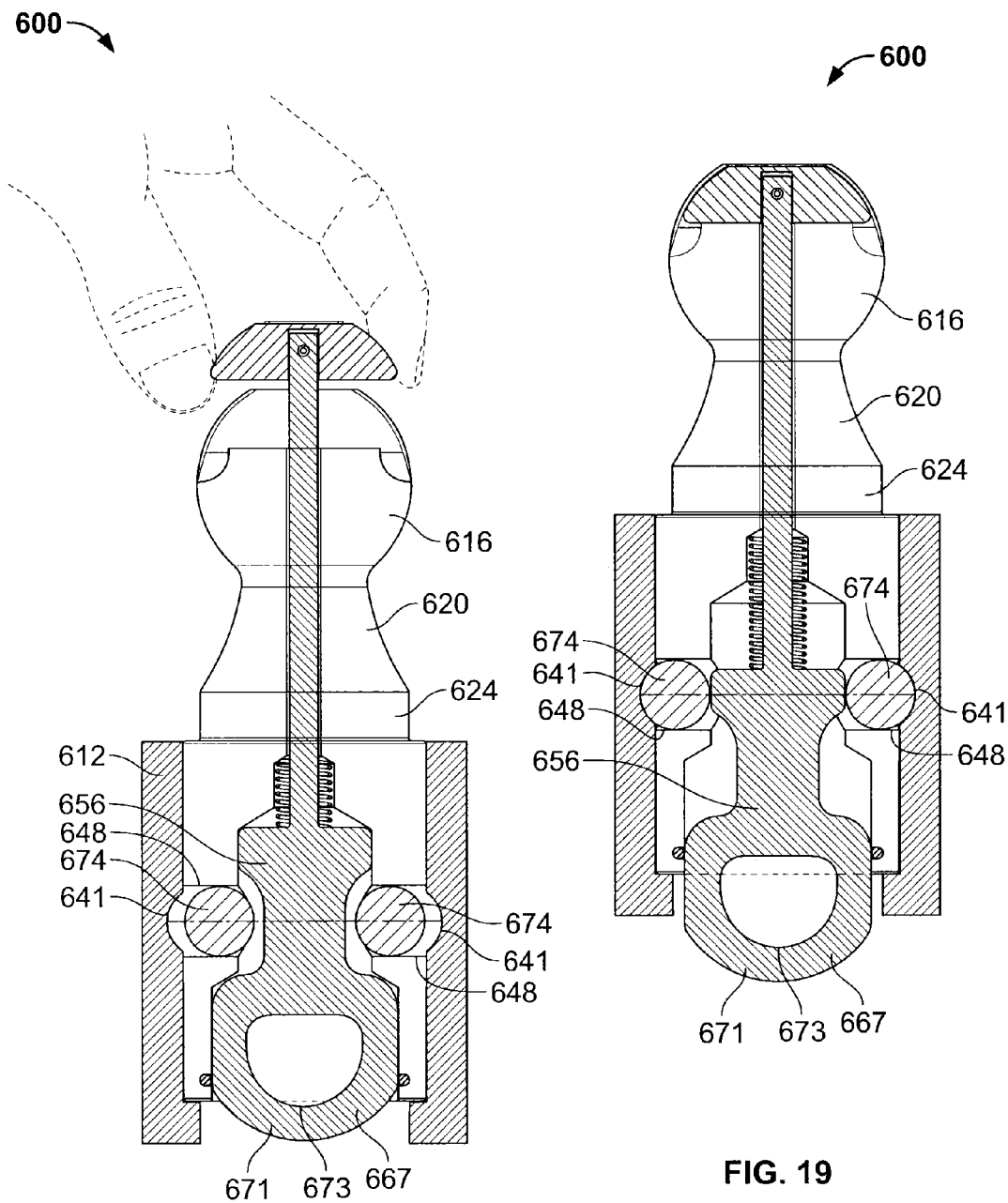
FIG. 18 is a cross-sectional view of the hitch ball assembly of FIG. 16 being released from the locked position while in an operative position.
FIG. 19 is a cross-sectional view of the hitch ball assembly of FIG. 16 in the locked and operative positions.
Figures 20, 21:
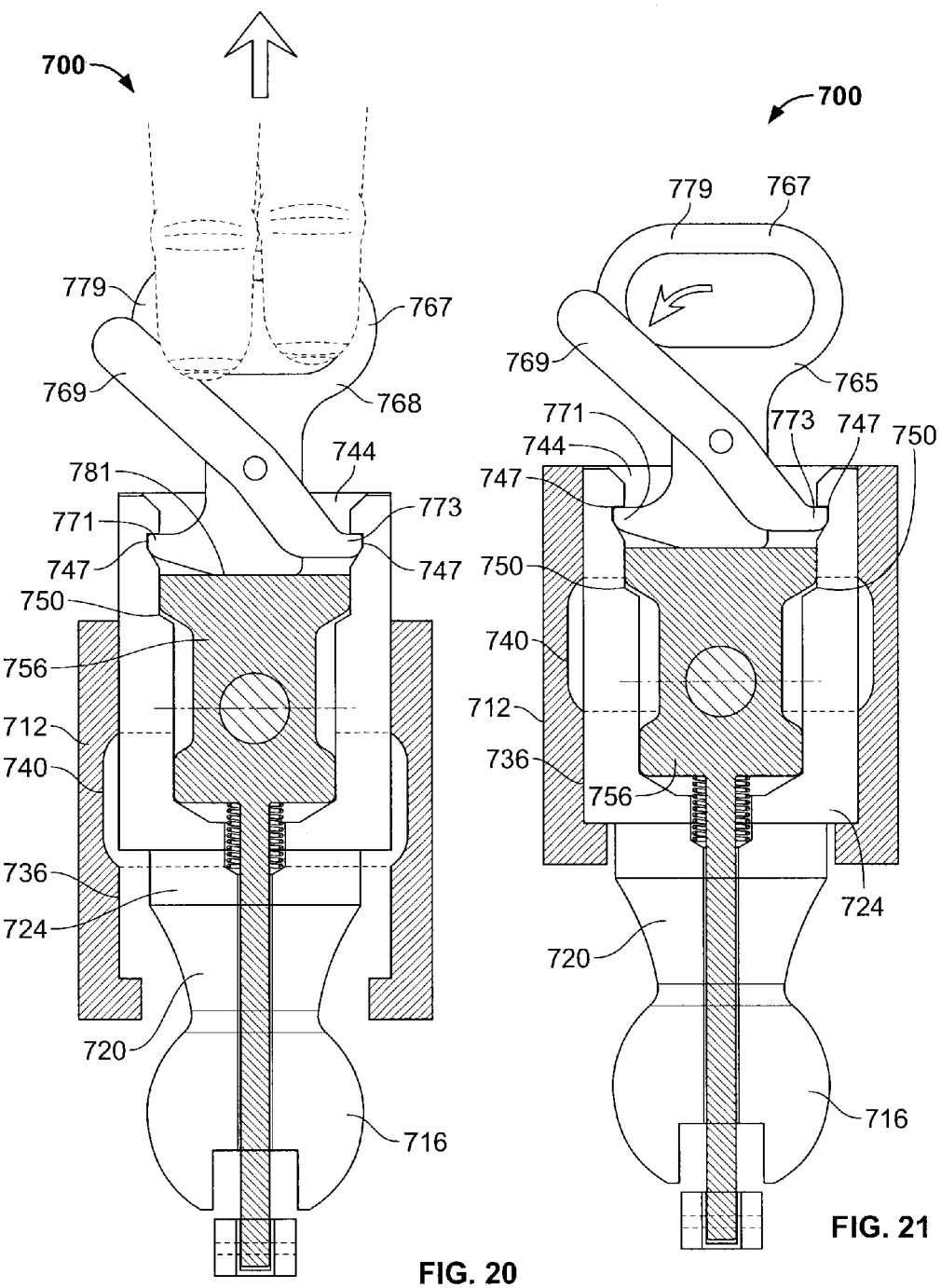
FIG. 20 is a cross-sectional view of embodiments of a hitch ball assembly being released from a locked position while in a stored position.
FIG. 21 is a cross-sectional view of the hitch ball assembly of FIG. 20 being released from the locked position while in the stored position.
Figure 22:
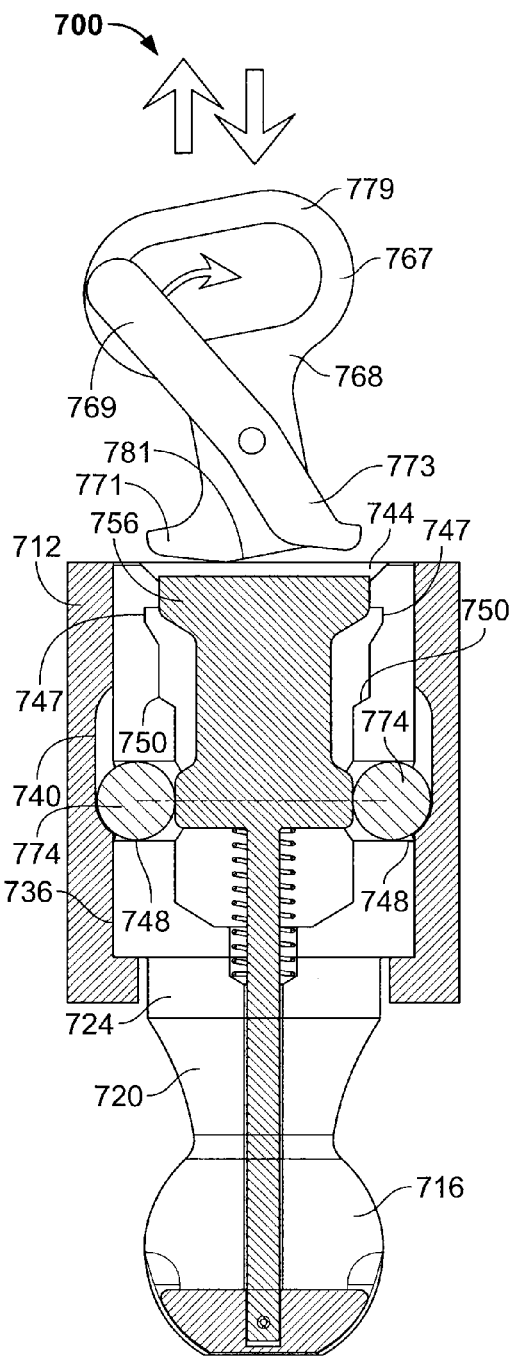
FIG. 22 is a cross-sectional view of the hitch ball assembly of FIG. 20 in the locked and stored positions.
Figure 23:
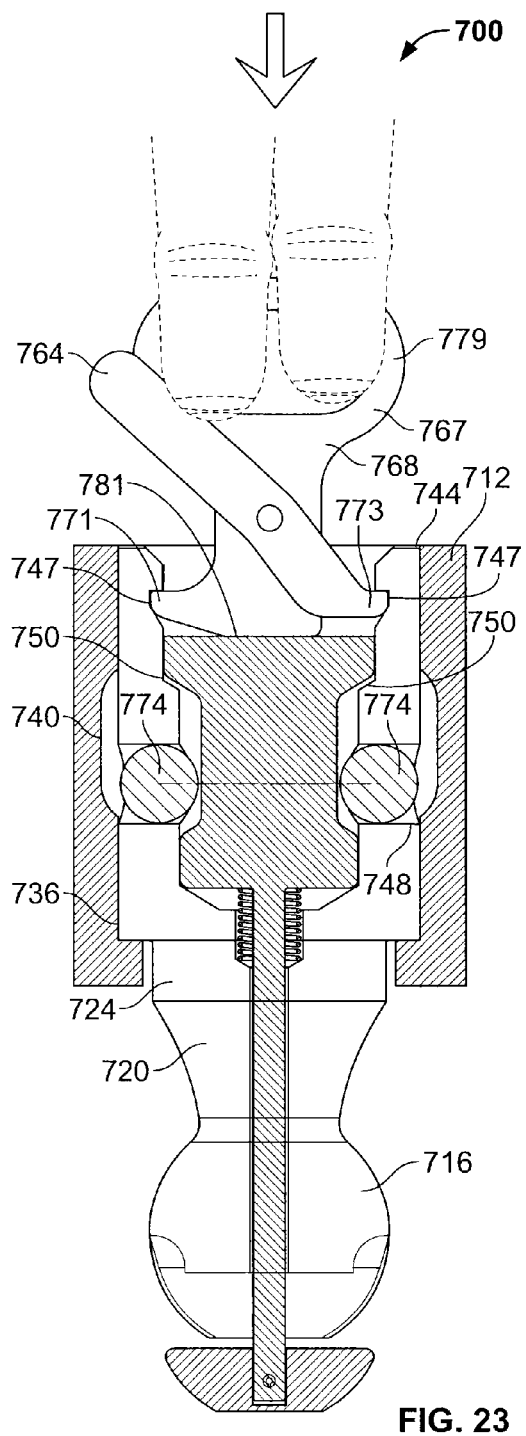
FIG. 23 is a second cross-sectional view of the hitch ball assembly of FIG. 20 being released from the locked position while in the stored position.
Figure 26:
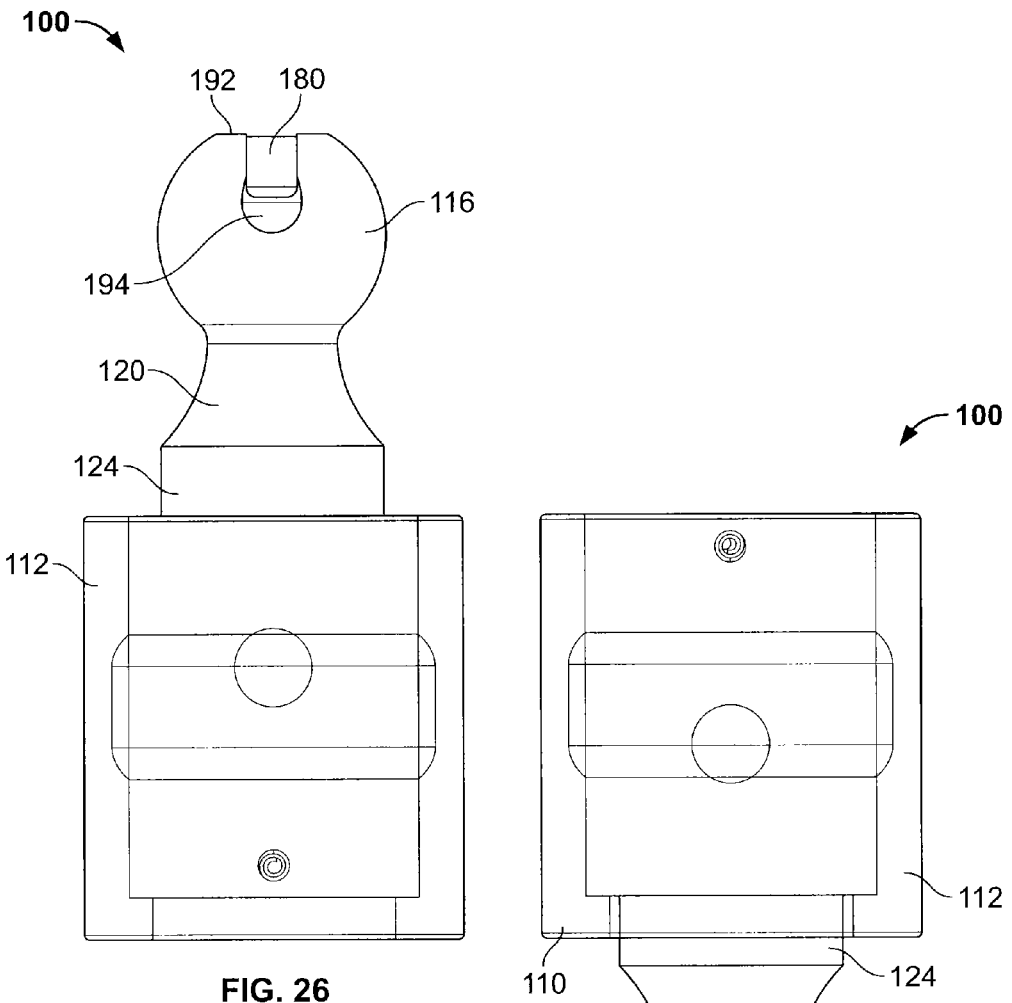
FIG. 26 is a side view of the hitch ball assembly of FIG. 2 in the operative and locked positions.
Figure 27:
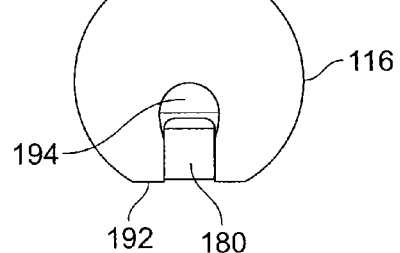
FIG. 27 is a side view of the hitch ball assembly of FIG. 2 in the stored and locked positions.

As shown in FIGS. 18 and 19, the handle 667 may be of a configuration that it may extend below a portion of the socket 612 when the hitch ball assembly 600 is in an operative position. The handle 667 may be of a configuration that it does not generally obstruct or otherwise get obstructed by the various components of the towing vehicle positioned below the load bed.

As shown in FIGS. 20-25, a hitch ball assembly 700 may have a construction generally similar to that of the hitch ball assembly 100, 300, 500 or 600. The hitch ball assembly 700 may include a ball member 716 and a body 720. The ball member 716 may be shaped to receive a corresponding socket (not shown) of a towed vehicle, such as a gooseneck coupler. The body 720 may include an insert portion 724 of any appropriate shape or size, such as being shaped for insertion into a hitch ball socket 712, as shown in FIGS. 20-25.

A hitch ball socket 712 of the embodiments shown in FIGS. 20-25 may include an inner portion 736 of any appropriate shape or size, such as a curved or rounded shape, for example. The inner portion 736 may include a groove 740 of any appropriate shape formed therein. By way of a non-limiting example, the groove 740 may be a generally annular groove formed therein. The present teachings, however, are not limited to an annular groove. The groove 740 may be a plurality of notches formed around the circumference of the inner portion 736. The notches may be formed at predetermined angles, such as every 90 degrees along the inner portion 736.

The insert portion 724 may also include a cavity 744. The cavity 744 may be positioned at any appropriate location within the insert portion 724. The cavity 744 may be of any appropriate shape or size, such as a cylindrical shape, by way of a non-limiting example. The cavity 744 may include at least one detent 747. As shown, the cavity 744 may include a first and second detent 747, 750 respectively. The first detent 747 may be an annular drove formed in the cavity 744 or may be a pair of detents 747 positioned laterally from one another, such as by way of a non-limiting example, 180 degrees from each other. The second detent 750 may have a similar construction as the first detent 747. Specifically, the second detent 750 may be an annular drove formed in the cavity 744 or may be a pair of detents 750 positioned laterally from one another, such as by way of a non-limiting example, 180 degrees from each other. In some embodiments, the first and second detent 747, 750 may be of different constructions. The present teachings are not limited to a specific construction.

The hitch ball assembly 700 may also include a pair of locking members 774 of any appropriate configuration. The locking members 774 may be configured to engage with the retaining groove 741 to engage and generally lock the hitch ball assembly 700 within the hitch ball socket 712. In some embodiments, the locking members 774 may include a pair of ball bearings operatively engaged with apertures 748 of the insert portion 724. The locking members 774 may extend within the apertures 748 generally releasing the locking members 774 from engagement with the retaining groove 741. The hitch ball assembly 700 may then be released from the hitch ball socket 712.

Further, the hitch ball assembly 700 may include a plunger 756. The plunger 756 may operate substantially similar to any one or any combination of the plungers 156, 356, 556 and 656. The hitch ball assembly 700 may also include a separate handle 767. As shown, the separate handle 767 may be of a general scissor construction. The handle 767 may include a body 768 and a leg 769. The leg 769 may be pivotally attached with the body 768. The body 768 may include an engaging portion 771 configured to engage with at least one of the first and second detents 747, 750. The leg 769 may include an engaging portion 773 configured to engage with at least one of the first and second detents 747, 750. As shown in FIGS. 20-25, the engaging portions 771, 773 may be configured to engage with the first detents 747.

The handle 767 may include a plunger engaging portion 781 configured to engage with the plunger 756. In some embodiments, the plunger engaging portion 781 may be positioned on the body 768 in proximity to the engaging portion 771. The handle 767 may also include a grasping portion 779. The grasping portion 779 may be of a generally oval shape such that a user may insert his or her fingers therein and grasping may be easily accomplished. The present teachings, however, are not limited to this configuration. Any appropriate configuration may be used without departing from the present teachings.

When the hitch ball assembly 700 is in the stowed position, the user may insert the handle 767 into the cavity 744 in the body 720 as shown in FIGS. 20-23. As the user inserts the handle 767, the handle 767, or more specifically, the plunger engaging portion 781 may depress the plunger 756 in a generally downward direction toward the ball member 716. As the plunger 756 moves downward, the plunger 756 may disengage from the locking members 774.

The locking members 774 may disengage from the hitch ball socket 712, or more specifically from the groove 740. Upon insertion of the handle 767, the first and second engaging portion 771, 773 may operatively engage with the first detent 747. This may operatively secure the handle 767 with the hitch ball assembly 700, or more specifically, with the insert portion 724. In some embodiments, the plunger 756 may be depressed until it engages with the second detent 750, which may generally prevent the plunger 756 from moving further axially downward. The user may then pull the handle 767 in an axial direction away from the load bed 104 and lift the hitch ball assembly 700 out of the hitch ball socket 712. Once the hitch ball assembly 700 is removed from the socket 712, the user may disengage the handle 767 from the hitch ball assembly 700 or more specifically, from the detents 747. The user may pivot the leg 769 to so disengage the handle 767. The user may store the handle 767 in any appropriate location. The user may then invert the hitch ball assembly 700 and insert it into the socket 712 with the ball member 716 extending upward from the socket 712 in the operative position as shown in FIG. 25.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A hitch ball comprising:
   a ball member;
   a body extending from and opposite the ball member;
   a locking member selectively extendable from the body;
   a first handle positioned in the ball member, the first handle in communication with the locking member, wherein positioning the first handle in a first direction positions the locking member within the body in a disengaged position; and
   a second handle positioned in the body, the second handle operatively coupled with the locking member, wherein positioning the second handle in a second direction positions the locking member within the body in the disengaged position.

2. The hitch ball of claim 1, wherein the first handle in an engaged position is generally coextensive with the ball member.

3. The hitch ball of claim 1, wherein the second handle is axially spaced from the ball member.

4. The hitch ball of claim 1, both of the ball member and body are configured for insertion into a socket.

5. The hitch ball of claim 1, wherein the first and second directions are a same direction.

6. The hitch ball of claim 1, further comprising a plunger, the plunger in operative engagement with the locking member.

7. The hitch ball of claim 6, wherein the second handle is operatively engaged with the plunger.

8. The hitch ball of claim 6, wherein the second handle is selectively engageable with either of the plunger or the body.

9. A hitch ball assembly comprising:
   a socket having an engaging device;
   a towing accessory member insertable within the socket;
   a body extending from the ball towing accessory member, the body insertable within the socket wherein the towing accessory member and the body are both configured to be inserted into the socket;
   a release mechanism; and
   a locking member in operative communication with the release mechanism, the release mechanism accessible from both of the towing accessory member and body, wherein the release member positions the locking member from a first position engaged with the engaging device of the socket and a second position disengaged from the engaging device of the socket.

10. The hitch assembly of claim 9, wherein the locking mechanism engages the engaging device in the first position whether the towing accessory member or the body is inserted into the socket.

11. The hitch assembly of claim 10, wherein the engaging device includes a generally annular groove positioned in the socket.

12. The hitch assembly of claim 10, wherein the engaging device includes first and second annular grooves positioned in the socket, the first and second annular grooves axially spaced apart.

13. The hitch assembly of claim 9, wherein the release mechanism is operatively engaged with the towing accessory member and the body.

14. The hitch assembly of claim 9, wherein the release mechanism is a handle accessible to a user when the towing accessory member inserted into the socket.

15. The hitch assembly of claim 9, wherein the release mechanism is biased in a locked position whereby the locking member is in the first position.

16. The hitch assembly of claim 9, further comprising a first handle operatively engaged with the release mechanism, the first handle positioned in the towing accessory member.

17. The hitch assembly of claim 16, further comprising a second handle operatively engaged with the release mechanism, the second handle positioned in the body axially spaced from the first handle.

18. The hitch assembly of claim 17, wherein the second handle is accessible when the towing accessory member extends downward into the socket.

19. A hitch ball comprising:
    a ball member insertable into a socket of a hitch assembly;
    a body extending from and opposite the ball member, the body insertable into the socket of the hitch assembly; and
    a locking member positioned in the body, the locking member moveable between an engaged position and a disengaged position, wherein the locking member in the engaged position locks the ball member in both an upright position relative to the socket and an inverted position relative to the socket.

20. The hitch ball of claim 19, further comprising a release mechanism in operative communication with the locking member, the release mechanism positionable between a first position moving the locking member to the engaged position to a second position moving the locking member to the disengaged position.

21. The hitch ball of claim 20, further comprising first and second handles operatively coupled with the release mechanism.

22. The hitch ball of claim 21, wherein the first handle is positioned in the ball member and the second handle is positioned in the body.

23. The hitch ball of claim 22, wherein the first handle is coextensive with the ball member.

24. The hitch ball of claim 22, wherein the second handle includes a handle pivotally attached with the body opposite the ball member.

25. The hitch ball of claim 22, wherein the release mechanism includes a plunger whereby the second handle includes a pin member attached with the plunger opposite the ball member.

26. The hitch ball of claim 22, wherein the release mechanism includes a plunger whereby the second handle includes a handle member selectively attachable to the plunger opposite the ball member.

27. The hitch ball of claim 22, wherein the second handle includes a handle member selectively attachable to the body opposite the ball member.

* * * * *